United States Patent
Shiraiwa et al.

(10) Patent No.: US 6,814,526 B2
(45) Date of Patent: Nov. 9, 2004

(54) INSERT HOLDER FOR PARTING AND GROOVING OPERATIONS

(75) Inventors: Akio Shiraiwa, Kobe (JP); Per Hansson, Gävle (SE)

(73) Assignee: Sandvik Aktiebolag, Sandviken (SE)

(*) Notice: Subject to any disclaimer, the term of this patent is extended or adjusted under 35 U.S.C. 154(b) by 83 days.

(21) Appl. No.: 10/125,414

(22) Filed: Apr. 19, 2002

(65) Prior Publication Data

US 2002/0154959 A1 Oct. 24, 2002

(30) Foreign Application Priority Data

Apr. 24, 2001 (SE) .............................................. 0101419

(51) Int. Cl.$^7$ ............................ B23P 15/28; B26D 1/00
(52) U.S. Cl. ..................... 407/110; 407/107; 407/117
(58) Field of Search ............................ 407/102, 106, 407/107, 108, 109, 110, 111, 117

(56) References Cited

U.S. PATENT DOCUMENTS

| | | | | |
|---|---|---|---|---|
| 4,244,666 A | * | 1/1981 | Erickson et al. | 407/105 |
| 4,321,846 A | * | 3/1982 | Neamtu | 82/158 |
| 4,697,963 A | * | 10/1987 | Luck | 407/105 |
| 5,207,537 A | * | 5/1993 | Englund | 407/110 |
| 5,411,354 A | | 5/1995 | Gustafsson | |
| 6,139,227 A | * | 10/2000 | Schafer et al. | 407/110 |
| 6,186,704 B1 | * | 2/2001 | Hale | 407/101 |

* cited by examiner

Primary Examiner—Daniel W. Howell
Assistant Examiner—Brian D. Walsh
(74) Attorney, Agent, or Firm—Burns, Doane, Swecker & Mathis, L.L.P.

(57) ABSTRACT

A holder is designed to receive a cutting insert intended for parting and grooving operations. The insert is clampable in a seat formed between a blade tongue and a clamping finger which respectively extend from lower and upper front parts of the holder. A gap separates those front parts in order to enable those parts to be forced towards each other by means of a clamping mechanism mounted in the holder. The clamping mechanism comprises a drawbar, a first end portion of which is movable within a bore formed in one of the front parts, and a second end portion of which is fixed in the other front part. The first end portion of the drawbar includes a head having a frusto-conical abutment surface. A tightening screw is threadedly mounted in the same front part as the head and is arranged to contact the abutment surface to displace the drawbar in a direction forcing the clamping finger and the tongue together to clamp the cutting insert in place.

14 Claims, 2 Drawing Sheets

INSERT HOLDER FOR PARTING AND GROOVING OPERATIONS

This application claims priority under 35 U.S.C. §§119 and/or 365 to Patent Application Serial No. 0101419-0 filed in Sweden on Apr. 24, 2001, the entire content of which is hereby incorporated by reference.

1. Technical Field of the Field

This invention relates to a cutting tool intended for parting and grooving operations of the type that comprises a holder for a narrow cutting insert which is clampable in a seat between a blade tongue and a clamping finger protruding as extensions of the lower and upper front parts of the holder. The front parts are thicker than the blade tongue and the clamping finger and are spaced-apart by a gap which enables swivelling of the front parts—and thereby also the blade tongue and clamping finger, respectively, in a direction towards each other from a starting position, more precisely by means of a clamping mechanism mounted in the holder.

2. Prior Art

Cutting tools of the above-mentioned type are used for grooving, parting, or other operations in which grooves are turned in rotating workpieces, primarily workpieces of metal. A general aim is to form the cutting insert as narrow as possible (with modern technology, the cutting inserts may have a thickness as small as 1–2 mm). For this reason, the blade tongue and the clamping finger have a thickness or width, which amounts to only a fraction of the width of the holder.

In previously known cutting tools of the type in question (see, for instance, U.S. Pat. No. 5,411,354), the clamping mechanism has the form of a simple screw which is inserted from above into a bore in the upper front part and screwed tight into a threaded hole in the lower front part, whereby the head of the screw is accessible from the top side of the upper front part. This entails problems in such applications where it is desirable to mount a plurality of cutting tools close to each other in the same plane so far that it becomes difficult to insert and manipulate a key in the limited space between neighboring tools. The disadvantages of the unsatisfactory accessibility of the tightening screws become particularly apparent with small cutting tools of the type called "Swiss Tools." Another disadvantage of the previously known cutting tools is that the tightening torque of the tightening screw, and thereby the clamping force of the cutting insert, cannot be determined in any well-defined way.

AIMS AND FEATURES OF THE INVENTION

The present invention aims at obviating the above-mentioned disadvantages of previously known cutting tools for parting and grooving operations and at providing an improved cutting tool of this type. Therefore, a primary aim of the invention is to provide a cutting tool, the clamping mechanism of which is conveniently accessible for a key or the like also in such cases when a plurality of tools are mounted near each other. An additional aim is to create a cutting tool, the clamping mechanism of which should be structurally simple and which works in a reliable manner, whereby the correct clamping force on the cutting insert is obtained in a simple manner, more precisely without the operator needing to devote mental effort to this problem in connection with the continuous repetitive change of cutting inserts.

The present invention relates to a cutting insert holder which comprises a body forming upper and lower front parts that are spaced apart by a gap to enable the upper and lower front parts to move toward one another. A tongue projects from the lower front part, and a clamping finger projects from the upper front part and overlies the tongue in spaced relationship thereto to form an insert seat therebetween. The clamping finger and the tongue are narrower than each of the upper and lower front parts. The tongue and the clamping finger are movable toward one another as the upper and lower front parts move toward one another. A clamping mechanism is disposed in the body and includes a drawbar and a tightening screw. The drawbar extends slidably through a bore formed in one of the upper and lower front parts and is fixedly secured to the other of the upper and lower front parts. The drawbar includes a head having an abutment surface. The tightening screw is threadedly connected to the body and projects into the one of the upper and lower front parts at an angle relative to the bore and has first and second end sections. The first end section is accessible to a tool for rotating the tightening screw to advance the tightening screw in a direction for bringing the second end section thereof into engagement with the abutment surface to displace the drawbar relative to the one of the upper and lower front parts in a direction forcing the tongue and the tightening finger toward one another.

BRIEF DESCRIPTION OF THE APPENDED DRAWINGS

The objects and advantages of the invention will become apparent from the following detailed description of preferred embodiments thereof in connection with the accompanying drawings in which like numerals designate like elements and in which.

DETAILED DESCRIPTION OF PREFERRED EMBODIMENTS OF THE INVENTION

Figure 1:
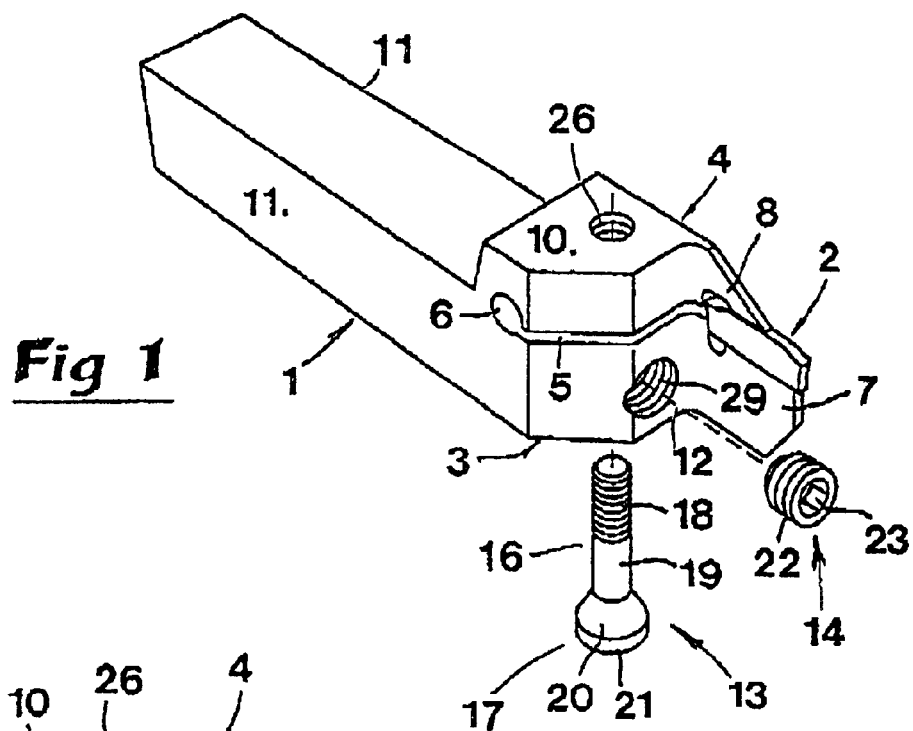
FIG. 1 is a perspective exploded view showing a first embodiment of a cutting tool according to the invention.
Figure 2:
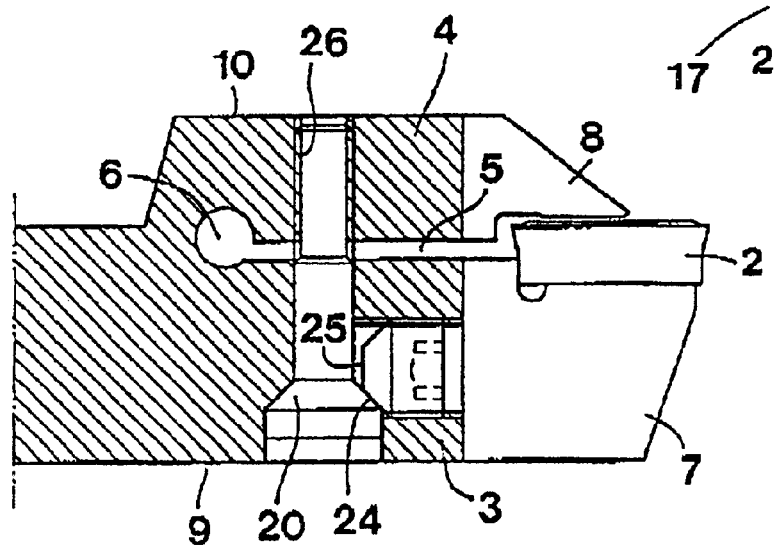
FIG. 2 is an enlarged, partial longitudinal section through the cutting tool according to FIG. 1, whereby the clamping mechanism is shown in a starting position in which a cutting insert may be inserted into the seat of the tool.
Figure 3:
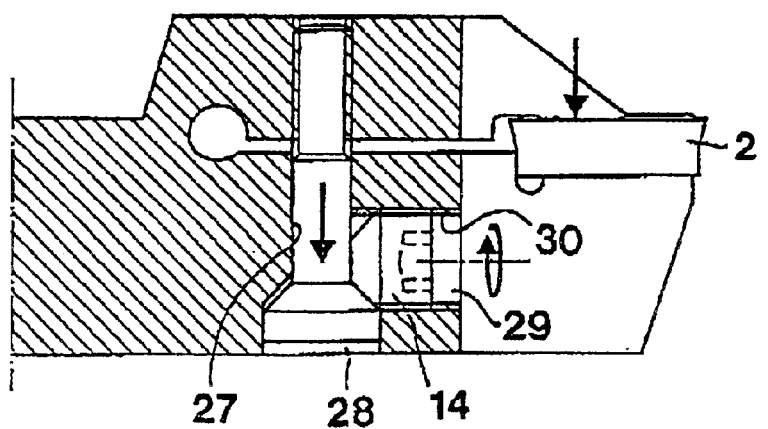
FIG. 3 is a longitudinal section corresponding to FIG. 2 showing the cutting insert in a clamped state.

In FIGS. 1–3, a cutting tool is shown including a holder 1 and a cutting insert 2. In this example, the holder 1 comprises a body having the shape of a long narrow shaft, with a quadrangular cross-section shape, which at a front end is formed with lower and upper front parts 3 and 4, respectively. Said front parts 3, 4 are spaced-apart by a gap 5 which at the back transforms into a cylindrical through cavity 6. The holder 1 is, in its entirety, manufactured from steel or other material having a certain inherent elasticity. Thanks to the existence of the gap 5, the front parts 3, 4 may be brought to swivel in relation to each other. A so-called blade tongue extends from the lower front part 3. A clamping finger 8 extends from the upper front part 4 in overlying, spaced relationship to the tongue 7. Together, the blade tongue 7 and the clamping finger 8 define a jaw-like seat in which the cutting insert 2 may be assembled and clamped. In practice, the blade tongue 7 and the clamping finger 8 (together with the cutting insert 2) have a thickness, which amounts to only a fraction of the width of the holder 1. Thus, the width of the holder may be 5–20 times larger than the thickness of the blade tongue and the clamping finger.

In the drawings, 9 designates a bottom side of the holder, while 10 designates a top side of the upper front part 4. The two opposite long sides of the holder are designated 11. At the front, the holder has a front side, in its entirety designated 12, which is formed by a plurality of surface portions of the lower and upper front parts.

As far as the shown cutting tool has been described hitherto, the same is in all essentials previously known in the art.

According to the invention, the tool includes a clamping mechanism, the main components of which consist of a drawbar 13 and a tightening screw 14. The drawbar 13 is composed of a long narrow shaft 16 and a head 17. The shaft 16 includes a male thread 18 formed in the end portion thereof disposed opposite the head 17, and also includes a cylindrical portion 19 having a smooth envelope surface. The head 17 is formed with a truncated conical abutment surface 20, which transforms into a cylindrical surface 21. More precisely, the surface 20 extends between a narrow end adjacent to the cylindrical portion 19 and a narrow end adjacent to the cylindrical surface 21. The cone angle of the surface 20, i.e., the angle formed between the surface 20 and a longitudinal axis of the drawbar, is 45 degrees in the example shown.

The screw 14 is formed with a male thread 22 and a key grip 23, which ports into a first end section of the screw. At the opposite end, i.e., second end section, the screw is formed with a cone surface 24 in the shape of a frusto-conical surface, the narrow (truncated) end of which transforms into a planar end surface 25, extending perpendicularly to the geometrical centre axis of the screw.

The surface 24 constitutes a contact surface; the surface 25 constitutes a stop surface; and the drawbar portion 19 defines an engagement surface.

The drawbar 13 is fixed in one of the front parts, namely, the upper front part 4, by means of a threaded joint which is formed by, on the one hand the male thread 18, and on the other hand a female thread (unnumbered) formed in a hole 26 in the front part 4. In the example, said hole 26 is a through-hole, although it is feasible, per se, to form the hole so that the same is a blind hole which ends at a distance from the top side 10 of the front part 4. It is alternatively feasible to secure the drawbar by means of a nut disposed in a depression in the top side of the front part 4.

The cylindrical part 19 of the shaft 16 of the drawbar is movable backwards and forwards (i.e., down and up) in a cylindrical bore 27 formed in the lower front part 3. Said bore 27 widens into a hollow space 28 of the lower front port 3 delimited by a conical surface and a cylindrical surface, in which space 28 the head 17 of the drawbar is normally seated. The hollow space 28 ports into the bottom side 9 of the holder.

The screw 14 is screwed into a hole 29 having a female thread 30, the hole 29 formed in the lower front part 3. In the example according to FIGS. 1–3, the geometrical centre axis of the hole 29 extends perpendicularly to the geometrical centre axis of the bore 27, whereby the cone surface 20 of the head 17 of the drawbar is arranged to cooperate with the cone surface 24 of the screw. It should furthermore be noted that the screw hole 29 preferably extends parallel to both the tongue 7 and the clamping finger 8 and thus ports into the front side 12 of the holder, more precisely at a point which is situated comparatively near the blade tongue 7, although at a certain distance from the same.

In FIG. 2, the tightening screw and the drawbar are shown in a starting position in which the front parts 3, 4 (and thereby the blade tongue 7 and the clamping finger 8) are maximally separated. In this position, the cutting insert 2 may be freely inserted into and removed from, respectively, the seat that is defined between the blade tongue and the clamping finger. When the cutting insert is to be clamped in the seat, the tightening screw 14 is tightened. Thereby, the cone surface 24 of the screw will be pressed against the cone surface 20 of the head 17 of the drawbar and successively press the drawbar downwards in the bore 27. In this way, the upper front part 4 is caused to turn (flex elastically) in the downwards direction while clamping the cutting insert in the seat by elastic deformation in the material adjacent to the cavity 6. When the planar end surface 25 of the screw meets the envelope surface of the cylindrical portion 19 of the drawbar, additional tightening of the screw is made impossible. In this state, the cutting insert has been clamped by a predetermined, optimum tensile force (which is determined by the choice of material and different geometrical parameters of the components included in the construction).

When the clamping finger 8 is to be brought back to the starting position thereof according to FIG. 2 in order to free the cutting insert 2, the screw 14 is simply unscrewed a distance in the appurtenant hole 29.

Figure 4:
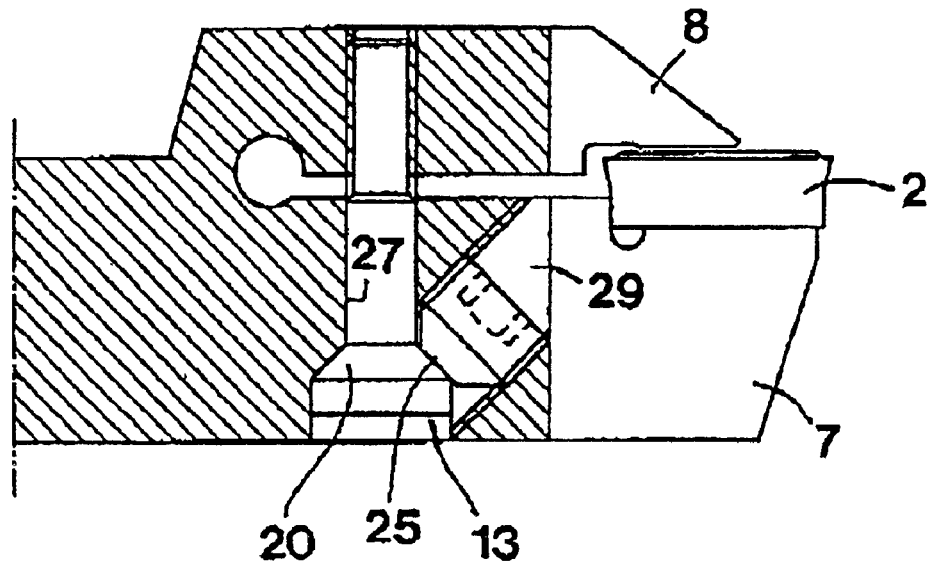
FIG. 4 is a partial longitudinal section showing a cutting tool according to an alternative embodiment of the invention, whereby the cutting insert is shown in a loosely mounted state.
Figure 5:
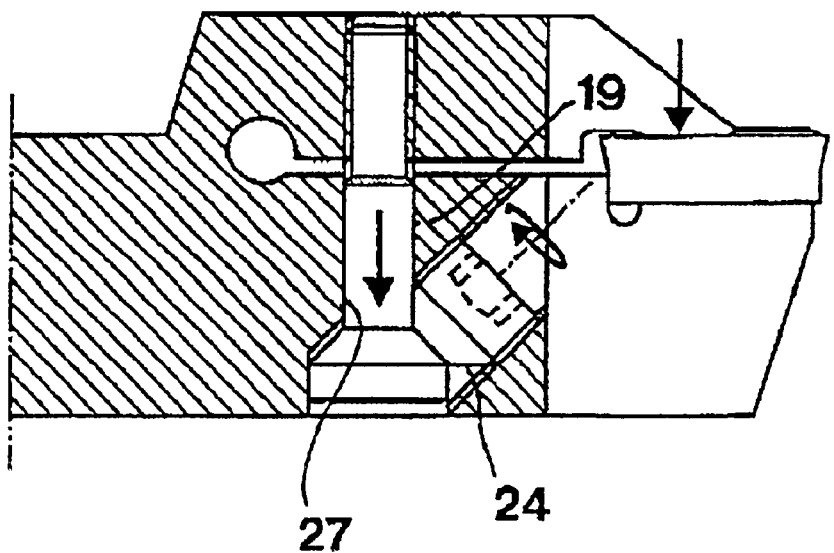
FIG. 5 is a longitudinal section showing the cutting insert in a clamped state.

In FIGS. 4 and 5, an alternative embodiment is shown, according to which the threaded hole 29 extends at an acute angle to the bore 27 for the drawbar 13. If the cone angle of the cone abutment surface 20 of the head of the drawbar amounts to 45°, the nose angle between the hole 29 and the bore 27 should also amount to 45°. In this embodiment, the plane end surface 25 of the screw constitutes a contact surface and will be pressed against the cone surface 20 of the head, which constitutes an abutment surface. In the same way as in the previously described embodiment, the drawbar will be pushed downwards in the appurtenant bore, when the tightening screw is tightened, from the starting position according to FIG. 4 to the clamping position according to FIG. 5. When the cone surface 24 of the screw. which constitutes a stop surface in this embodiment, meets the envelope surface (engagement surface) of the cylindrical portion 19 of the drawbar, the predetermined, optimum clamping force is reached in the same way as has been described above.

FEASIBLE MODIFICATIONS OF THE INVENTION

The invention is not only limited to the embodiments described above and illustrated in the drawings. Thus, it is possible to place the threaded hole for the tightening screw so that the same ports in one of the two long sides of the holder. It is also feasible to position the tightening screw and the head of the drawbar in the upper front part 4 of the holder instead of in the lower front part. It is also feasible to fix the drawbar in one of the front parts in another way than by means of a threaded joint.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A cutting insert holder comprising:
   a body forming a rear part and upper and lower front parts, the upper and lower front parts projecting forwardly from the rear part, the upper and lower front parts spaced apart by a gap to enable the upper and lower front parts to move toward one another, the upper front part joined integrally as one piece with the rear part at a location defining a fulcrum for the upper front part, a tongue projecting from the lower front part, and a clamping finger projecting from the upper front part and overlying the tongue in spaced relationship thereto, to form an insert seat therebetween, the clamping finger and the tongue being narrower than each of the upper and lower front parts, the tongue and the clamping finger being movable toward one another as the upper and lower front parts move toward one another; and a clamping mechanism disposed in the body and including:

a drawbar extending slidably through a bore formed in one of the upper and lower front parts and fixedly secured directly to the other of the upper and lower front parts, the bore widening into a space that opens at an outer surface of the body, the drawbar including a head disposed in the space and having an abutment surface, and a tightening screw threadedly connected to the body and projecting into the one of the upper and lower front parts at an angle relative to the bore and having first and second end sections, the first end section being accessible to a tool for rotating the tightening screw to advance the tightening screw in a direction for bringing the second end section thereof into engagement with the abutment surface to displace the drawbar relative to the one of the upper and lower front parts in a direction toward the outer surface and forcing the tongue and the clamping finger toward one another.

2. The holder according to claim 1 wherein the abutment surface is frusto-conically shaped; the second end section of the tightening screw including a frusto-conically shaped surface terminating in a planar end surface oriented perpendicular to a longitudinal axis of the tightening screw.

3. The holder according to claim 2 wherein the tightening screw extends perpendicularly to the drawbar, wherein the frusto-conically shaped surface of the tightening screw is engageable with the frusto-conically shaped abutment surface.

4. The holder according to claim 2 wherein the tightening screw extends at an oblique angle relative to the drawbar, with the end surface of the tightening screw being engageable with the abutment surface.

5. The holder according to claim 1 wherein the abutment surface is frusto-conically shaped; the second end portion of the tightening screw including a frusto-conically shaped surface arranged to engage the abutment surface.

6. The holder according to claim 1 wherein the abutment surface is frusto-conically shaped; the second end section of the tightening screw terminating in a planar end surface arranged to engage the abutment surface.

7. The holder according to claim 1 wherein the drawbar is fixedly secured to the other of the upper and lower front parts by a threaded connection.

8. The holder according to claim 1 wherein the one of the upper and lower front parts is defined by the lower front part.

9. The holder according to claim 1 wherein the tightening screw is disposed in a threaded hole formed in the one of the upper and lower front parts.

10. The holder according to claim 9 wherein the threaded hole extends substantially parallel to the tongue and the clamping finger.

11. A cutting insert holder comprising:

a body forming upper and lower front parts spaced apart by a gap to enable the upper and lower front parts to move toward one another, a tongue projecting from the lower front part, and a clamping finger projecting from the upper front part and overlying the tongue in spaced relationship thereto, to form an insert seat therebetween, the clamping finger and the tongue being narrower than each of the upper and lower front parts, the tongue and the clamping finger being movable toward one another as the upper and lower front parts move toward one another; and a clamping mechanism disposed in the body and including:

a drawbar extending slidably through a bore formed in one of the upper and lower front parts and threadedly fixed to the other of the upper and lower front parts, the drawbar including a head having a frusto-conical abutment surface, and a tightening screw threadedly connected in the one of the upper and lower front parts, the tightening screw extending at an angle relative to the bore and having first and second end sections, the first end section being accessible to a tool for rotating the tightening screw to advance the tightening screw in a direction for bringing the second end section thereof into engagement with the frusto-conical abutment surface to displace the drawbar relative to the one of the upper and lower front parts in a direction forcing the tongue and the clamping finger toward one another.

12. The holder according to claim 11 wherein the one of the upper and lower front parts is defined by the lower front part.

13. A cutting insert holder comprising:

a body forming upper and lower front parts spaced apart by a gap to enable the upper and lower front parts to move toward one another, a tongue projecting from the lower front part, and a clamping finger projecting from the upper front part and overlying the tongue in spaced relationship thereto, to form an insert seat therebetween, the clamping finger and the tongue being narrower than each of the upper and lower front parts, the tongue and the clamping finger being movable toward one another as the upper and lower front parts move toward one another; and a clamping mechanism disposed in the body and including:

a drawbar extending slidably through a bore formed in one of the upper and lower front parts and fixedly secured to the other of the upper and lower front parts, the drawbar including an abutment surface and an engagement surface oriented at an angle to the abutment surface, and a tightening screw threadedly connected to the body and projecting into the one of the upper and lower front parts at an angle relative to the bore and having first and second end sections, the second end section including a contact surface and a stop surface oriented at an angle to the contact surface, the first end section being accessible to a tool for rotating the tightening screw to advance the tightening screw in a direction for bringing the contact surface thereof into engagement with the abutment surface to displace the drawbar relative to the one of the upper and lower front parts in a direction forcing the tongue and the clamping finger toward one another, wherein the stop surface is arranged to engage the engagement surface for preventing further advancement of the tightening screw.

14. A cutting insert holder comprising:

a body forming upper and lower front parts spaced apart by a gap to enable the upper and lower front parts to move toward one another, a tongue projecting from the lower front part, and a clamping finger projecting from the upper front part and overlying the tongue in spaced relationship thereto, to form an insert seat therebetween, the clamping finger and the tongue being narrower than each of the upper and lower front parts, the tongue and the clamping finger being movable toward one another as the upper and lower front parts move toward one another; and a clamping mechanism disposed in the body and including:

a drawbar extending slidably through a bore formed in one of the upper and lower front parts and fixedly secured to the other of the upper and lower front parts, the drawbar including a head having a frusto-conically shaped abutment surface, and a tightening screw threadedly connected to the body and projecting into the one of the upper and lower front parts at an angle relative to the bore and having first and second end sections, the second end section including a frusto-conically shaped surface, the first end section being accessible to a tool for rotating the tightening screw to advance the tightening screw in a direction for bringing the frusto-conical surface of the second end section thereof into engagement with the abutment surface to displace the drawbar relative to the one of the upper and lower front parts in a direction forcing the tongue and the clamping finger toward one another.

* * * * *